United States Patent
Nakajima et al.

(10) Patent No.: US 7,029,719 B1
(45) Date of Patent: Apr. 18, 2006

(54) MAYONNAISE-LIKE FOOD AND METHOD OF MANUFACTURING THE SAME

(75) Inventors: Makoto Nakajima, Hyogo (JP); Hajime Ishida, Hyogo (JP); Kosaku Nakajima, Hyogo (JP); Masao Takatsuji, Hyogo (JP); Miyoko Ouchi, Hyogo (JP); Yoko Ida, Hyogo (JP)

(73) Assignee: Tajimaya Foods Co., Ltd., Itami (JP)

( * ) Notice: Subject to any disclaimer, the term of this patent is extended or adjusted under 35 U.S.C. 154(b) by 298 days.

(21) Appl. No.: 10/312,802

(22) PCT Filed: Nov. 20, 2000

(86) PCT No.: PCT/JP00/08189

§ 371 (c)(1),
(2), (4) Date: Jan. 10, 2003

(87) PCT Pub. No.: WO02/03814

PCT Pub. Date: Jan. 17, 2002

(30) Foreign Application Priority Data

| Jul. 10, 2000 | (JP) | ............................. 2000207730 |
| Jul. 24, 2000 | (JP) | ............................. 2000222894 |

(51) Int. Cl.
*A23L 1/36* (2006.01)
*A23D 1/00* (2006.01)

(52) U.S. Cl. ..................................... 426/604; 426/634
(58) Field of Classification Search ................. 426/605, 426/604, 598
See application file for complete search history.

(56) References Cited

FOREIGN PATENT DOCUMENTS

| JP | 55-099173 | * | 7/1980 |
| JP | 59-146555 | * | 8/1984 |
| JP | 63-032461 | * | 12/1988 |
| JP | 10-084904 | * | 7/1998 |
| JP | 2001-17119 A | | 1/2001 |
| JP | EP 1304114 | * | 4/2003 |

OTHER PUBLICATIONS

Shurtleff, W. et al. 1998. The Book of Tofu, vol. 1. Ten Sppe Press, Berkeley, CA, p. 22-24, 99-105, 107-109, 204-209.*
Anon. 1997. High concentrated soymilk processing message, dated Sep. 6, 1997. www.ag.uiuc.edu/archives/experts/utilization/1997/.*
Akiyama, Yoshihiro. Shokuhin to Kaihatsu, vol. 24, No. 2, pp. 58-59, 1989.
LaBell, Fran. Food Processing, vol. 49, No. 4, pp. 68-69, 1988.

* cited by examiner

*Primary Examiner*—Carolyn Paden
(74) *Attorney, Agent, or Firm*—Birch, Stewart, Kolasch & Birch, LLP

(57) ABSTRACT

A mayonnaise-like food, being an edible emulsified matter prepared by mixing and emulsifying soybean milk or bean curd, vinegar, seasoning, spice, emulsifier, and vegetable oil, in which the soybean milk is a concentrated soybean milk at Brix concentration of 20 to 40, or the bean curd is a concentrated bean curd prepared by coagulating a concentrated soybean milk at Brix concentration of 15 or more by use of a coagulant. Since concentrated soybean milk or concentrated bean curd is used, peculiar greenstuff smell and acridity of soybean can be suppressed, and a mayonnaise-like food having rich flavor and smooth texture can be obtained.

16 Claims, No Drawings

MAYONNAISE-LIKE FOOD AND METHOD OF MANUFACTURING THE SAME

This application is the national phase under 35 U.S.C. § 371 of PCT International Application No. PCT/JP00/08189 which has an International filing date of Nov. 20, 2000, which designated the United States of America.

TECHNICAL FIELD

The present invention relates to mayonnaise-like food using concentrated soybean milk or concentrated bean curd and its manufacturing method, and presents emulsified matter of low cholesterol with a strong flavor, being free from peculiar greenstuff smell and acridity of soybean.

BACKGROUND ART

Edible emulsified matter such as mayonnaise or dressing is manufactured by mixing and emulsifying water phase such as vinegar, salt, sugar, spice and oil phase such as salad oil, usually by using yolk as emulsifier, but cholesterol contained in the yolk and egg allergy are problems, and there is a strong demand for low fat and low calorie food, and it has been attempted to develop mayonnaise and dressing using vegetable protein instead of yolk. Prior arts about such food include the following.

(1) Prior art 1 (Japanese Laid-open Patent No. 63-32461)

To ordinary bean curd (i.e. tofu), similar product or dehydrated matter thereof, vinegar and/or fruit juice is added, and further 0.5 to 10% of vegetable oil, preferably 1 to 3% of soybean protein powder, and at least one of sugar, seasoning, spice, stabilizer and emulsifier are added, and they are homogeneously emulsified, and emulsified food is manufactured.

(2) Prior art 2 (Japanese Laid-open Patent No. 59-146555)

Emulsion stability of soybean milk is minimum around the isoelectric point, and hence when producing soybean milk from soybean, it is extracted by using aqueous solution of monovalent or divalent salt such as sodium chloride, potassium chloride, sodium sulfate or calcium chloride, and organic acid is added to make slightly acidic, and the resultant is heated. The soybean milk obtained by the above-mentioned special treatment is used as a water phase, and oil is added and emulsified to obtain an emulsified composition.

(3) Prior art 3 (Japanese Laid-open Patent No. 55-99173)

This is a semisolid dressing using soybean protein as emulsifier, and first neutral soybean protein aqueous solution containing seasoning and spice and edible oil are sufficiently emulsified, and vinegar is added by dripping, and emulsification is smooth and a stable dressing is obtained.

Mayonnaise or dressing of non-cholesterol and low fat type using vegetable oil without using yolk or whole egg is manufactured by mainly utilizing the emulsifying function of soybean protein.

In Prior art 1, bean curd is used as vegetable protein, and further stabilizer such as xanthan gum or guar gum or emulsifier such as lecithin is added (see Examples 1 to 3 of Prior art 1).

In Prior art 2, specially treated soybean milk is used as vegetable protein, and further lecithin is added (see Example 1 of Prior art 2). In Prior art 3, soybean protein is used as emulsifier, and further preferably natural paste such as tamarind seed gum is added as emulsifier aid.

Reviewing the exemplary examples of bean curd and soybean milk in the Prior arts, smooth bean curd and ordinary bean curd obtained by conventional method are used in Examples 1 to 3 of Prior art 1, soybean milk of 14% solid content of soybean extracted by salt heat aqueous solution is used in Example 1 of Prior art 2, and separated soybean protein and extracted soybean protein are used in Examples 1 to 3 of Prior art 3.

On the other hand, when mayonnaise-like food is manufactured by using bean curd or soybean milk, as compared with the case of using yolk or whole egg, peculiar greenstuff smell, acridity, and bitterness of soybean are mixed in, and there is a sense of resistance in taste and flavor, and when presented on the market, if the product sells temporarily, the sale does not last long.

It is a technical object of the invention to present a novel emulsified matter having rich taste and flavor, while suppressing the peculiar greenstuff smell or acridity of soybean.

The present inventors intensively studied emulsified matters using soybean milk, and found out the peculiar greenstuff smell and acridity of soybean are suppressed, in spite of an extremely high concentration of solid matter, by using concentrated soybean milk of extremely high concentration of about Brix concentration of 25, instead of soybean milk of ordinary concentration or slightly high concentration such as soybean milk of about 14% as disclosed in Prior art 2, and also discovered that the peculiar greenstuff smell and acridity of soybean can be also suppressed in the bean curd prepared by using such concentrated soybean milk.

DESCRIPTION OF THE INVENTION

A first aspect of the invention relates to a mayonnaise-like food made of concentrated soybean milk, being an edible emulsified matter prepared by mixing and emulsifying soybean milk, vinegar, seasoning, spice, emulsifier, and vegetable oil, in which the soybean milk is a concentrated soybean milk at Brix concentration of 20 to 40.

A second aspect of the invention relates to a mayonnaise-like food made of concentrated bean curd, being an edible emulsified matter prepared by mixing and emulsifying bean curd, vinegar, seasoning, spice, emulsifier, and vegetable oil, in which the bean curd is a concentrated bean curd prepared by coagulating a concentrated soybean milk at Brix concentration of 15 or more by use of a coagulant.

A third aspect of the invention relates to a manufacturing method of mayonnaise-like food characterized by mixing and preliminarily emulsifying vinegar, seasoning, spice, and emulsifier, mixing a concentrated soybean milk at Brix concentration of 20 to 40 or a concentrated bean curd prepared by coagulating a concentrated soybean milk at Brix concentration of 15 or more by use of a coagulant, and further mixing and emulsifying vegetable oil.

In the invention, the emulsifier is preferably one or two or more types selected from the group consisting of thickening polysaccharide, lecithin, fatty acid monoglyceride, fatty acid polyglyceride, sucrose fatty acid ester, and sorbitan fatty acid ester.

BEST MODE CARRYING OUT THE INVENTION

The mayonnaise-like food of the invention is manufactured by mixing vinegar, seasoning, spice, and emulsifier, emulsifying preliminarily by adding water as required, mixing a concentrated soybean milk at Brix concentration of 20 or more, and further adding vegetable oil and emulsifying;

or by mixing vinegar, seasoning, spice, and emulsifier, emulsifying preliminarily by adding water as required, mixing a concentrated bean curd prepared by coagulating a concentrated soybean milk at Brix concentration of 15 or more by use of a coagulant, and further adding vegetable oil and emulsifying.

The mayonnaise-like food of the invention is a concept including mayonnaise, salad dressing, French dressing, spread, tartar sauce, other semisolid dressing, and emulsified liquid dressing, but mayonnaise is most preferred.

The concentrated soybean milk includes ordinary soybean milk obtained by extracting ground soybean in hot water by conventional method, and high concentration soybean milk obtained by concentrating soybean milk analogous matter prepared from soybean protein powder or soybean milk powder.

Soybean milk can be concentrated by known methods, by removing water from soybean milk by decompression process or thin membrane process. For example, soybean milk is concentrated in the condition of steam pressure of 6 $kg/cm^2G$ and steam temperature of 45° C. and under reduced pressure of 700 mmHg or less, and then preferably, emulsified particles are homogenized by high pressure homogenizing process.

The Brix concentration of soybean milk or the like is generally 20 to 40, preferably 22 to 30, when using concentrated soybean milk as material for the mayonnaise-like food of the invention, from the viewpoint of manufacturing emulsified matter rich in flavor, while avoiding mixing of greenstuff smell or acridity in the final product of mayonnaise-like food; or generally 15 or more, preferably 20 to 30, or more preferably 25 to 30, when using concentrated bean curd as material.

Generally unpleasant flavor such as peculiar greenstuff smell, acridity or bitterness of soybean is said to be mainly caused by lipoxygenase, a biological active substance contained in soybean, which acts catalytically on the polyunsaturated fatty acids contained in soybean oil or their esters, thereby producing, by oxidation, volatile matters such as n-hexanol, n-hexanal, 1-octene-3-ol, isopentanol, etc. In the invention, since the soybean milk is concentrated to Brix concentration of 15 or more, in this enriching process, volatile matters such as n-hexanol, n-hexanal and the like can be decreased substantially (see Test Examples below).

As a result, the concentrated soybean milk is almost free from peculiar greenstuff smell or acridity of soybean, and the mayonnaise-like food of the invention manufactured from this concentrated soybean milk or concentrated bean curd made from it is free from peculiar smell of soybean, and has rich flavor and deep taste.

The obtained concentrated soybean milk may be spontaneously solidified in protein by heat, but different from the bean curd solidified by a coagulant, this is soft and fragile solidified matter, and it can be directly presented to the emulsifying process for mayonnaise-like food, or it may be slightly ground by mixer, food cutter or Stefan cutter.

The concentrated bean curd used in the second aspect of the invention is prepared by solidifying the same concentrated soybean milk by using known coagulants, such as calcium chloride, magnesium chloride, calcium sulfate, or other divalent metal salt, or glucono delta lactone, lactic acid, malic acid, citric acid, or other acids.

The Brix concentration of the soybean milk used in this process is, as mentioned above, generally 15 or more, preferably 20 to 30, or more preferably 25 to 30, in order to avoid invasion of greenstuff smell or acridity into mayonnaise-like food as final product and to manufacture emulsified matter rich in flavor.

From the viewpoint of obtaining a smoother texture of concentrated bean curd, it is preferred to use a coagulant by mixing magnesium chloride and glucono delta lactone, but when using bittern, it is preferred to cool the soybean milk beforehand.

The obtained concentrated bean curd is roughly crushed by mixer, food cutter, or Stefan cutter to such an extent that small grains are left over, and bean curd paste is prepared. However, since it is stirred in the later emulsifying process, this crushing process may be omitted.

In the general mayonnaise manufacture, yolk, vinegar, seasoning and spice are blended, or further water is added to mix, and vegetable oil and vinegar are added alternately to be emulsified by a mixer, and further the oil is dispersed as fine particles in the water phase by colloid mill, and an oil in water type emulsion is formed.

In the emulsifying process of mayonnaise-like food of the invention, basically, the yolk in the mayonnaise manufacturing process is replaced by concentrated soybean milk or concentrated bean curd, and, for example, a water phase of vinegar, seasoning, spice and emulsifier, or a water phase further adding water as required is continuously mixed and stirred by mixer, and the concentrated soybean milk or concentrated bean curd is added, and vegetable oil is mixed by dividing in three or four portions. The mixture is stirred by colloid mill or the like, and heated and sterilized to obtain mayonnaise-like food. Meanwhile, the concentrated soybean milk and concentrated bean curd may be both used. In such a case, the mixing ratio of the two may be properly selected depending on the desired properties or form of mayonnaise-like food.

Examples of vegetable oil include soybean oil, cotton seed oil, corn oil, sesame oil, sunflower oil, rapeseed oil, olive oil, rice oil, grape oil, peanut oil, safflower oil, palm oil, salad oil, etc.

Examples of vinegar include apple and other fruit vinegar, rice vinegar, alcohol vinegar, sake lees vinegar, brown rice vinegar, wine vinegar, balsamico, etc.

Examples of seasoning include sweetener such as sugar (granulated sugar, fine sugar, brown sugar, crystal sugar, soft sugar etc.), glucose, fructose, mixed liquid sugar, starch syrup and the like, salt, sour seasoning such as citric acid and the like, citrus juice, chemical seasoning, etc.

Moreover, strawberry, blueberry, aloe, peach, orange, melon, acerola, kiwifruit, grapefruit, other fruits, tea, sesame, butter, cheese, skimmed milk, whole milk powder, condensed milk, vanilla, and their flavor may be also added as the seasoning.

Spices include mustard, pepper, paprika, etc.

The mixing ratio of the concentrated soybean milk or concentrated bean curd, and vinegar, vegetable oil and others may be properly adjusted depending on the texture, flavor or taste of the mayonnaise-like food or properties of emulsified matter, but the content of the concentrated soybean milk or concentrated bean curd in the mayonnaise-like food is generally 5 to 60 wt. %, preferably 10 to 30 wt. %. The content of vinegar in the mayonnaise-like food is generally 5 to 40 wt. %, preferably 7 to 25 wt. %, and the content of vegetable oil in the mayonnaise-like food is generally 10 to 80 wt. %, preferably 20 to 70 wt. %.

The water phase portion and oil phase portion can be emulsified by known emulsifying means, such as mixer, colloid mill, paddle mixer, homogenizer, agitator, etc.

At this time of emulsifying, since the soybean milk is soybean protein, it has a certain emulsifying power, but from the viewpoint of enhancing the emulsifying power, it is preferred to add an emulsifier as an auxiliary substance. Besides, since the concentrated bean curd has a weaker emulsifying power than the soybean milk, it is required to add an emulsifier.

Various emulsifiers may be used, including thickening polysaccharide, lecithin, fatty acid monoglyceride, fatty acid polyglyceride, sucrose fatty acid ester, and sorbitan fatty acid ester, and they may be used by combining two or more types.

The thickening polysaccharide includes carrageenan, xanthan gum, tragacanth gum, gellan gum, pectin, locust bean gum, guar gum, tamarind seed gum, gum arabic, agar, sodium arginate, other arginate, furcellaran, gluco mannan, konjak mannan, etc.

The lecithin includes soybean lecithin and yolk lecithin. Besides, kephalins belonging to the same phospholipid as lecithin may be also used.

Preferred examples of emulsifier include lecithin, fatty acid monoglyceride, sucrose fatty acid ester, xanthan gum, locust bean gum, guar gum, tragacanth gum, tamarind seed gum, pectin, etc.

As the emulsifier of the invention, from the viewpoint of excellent emulsifying power, yolk and whole egg are not excluded although there is problem of increase of cholesterol content.

The content of the emulsifier in the mayonnaise-like food may be properly adjusted depending on the properties of the emulsified matter, and is generally 0.01 to 5.0% wt. %, or preferably 0.1 to 3.0 wt. %.

In manufacture of mayonnaise-like food of the invention, the emulsified matter obtained in the emulsifying process is heated, sterilized, and cooled. The condition of heating and sterilization is 65 to 85° C., 40 to 60 minutes, approximately.

In the mayonnaise-like food of the invention, oligosaccharide may be also added. Oligosaccharide has water release preventive action of concentrated bean curd in manufacture, and oligosaccharide has a sweetness adjusting action, and it may be also used as sweetener. Oligosaccharide refers to a saccharide of which unit polymerization degree is about 2 to 10, and specific examples include isomalto-oligosaccharide, galacto-oligosaccharide, fructo-oligosaccharide, xylo-oligosaccharide, lacto-oligosaccharide, nigero-oligosaccharide, trehalose, dextrose, lactulose, genthiobiose, raffinose, stachiose, etc.

INDUSTRIAL APPLICABILITY (1) Being made of concentrated soybean milk or concentrated bean curd, the mayonnaise-like food of the invention is free from unpleasant flavor such as greenstuff smell, acidity or bitterness, and is rich and excellent in flavor, and hence can be taken smoothly when eating or swallowing. Different from the basic tastes such as sweetness, sourness, or saltiness, a new flavor characterized by richness and smoothness can be given to the food.

Not using yolk or whole egg, there is no problem in egg allergy, cholesterol, or calorie, and emulsified products using soybean milk (or bean curd) suited to needs of consumers can be newly presented to the market.

(2) The mayonnaise-like food of the invention is not sticky, and does not deform easily, but a soft and stable body is maintained, and it can be preferably used in topping and sandwich, and it can be widely applied in cakes and confectionery.

(3) In the emulsified matter using concentrated soybean milk, since the concentrated soybean milk can be directly presented in the emulsifying process, the manufacturing process is simplified, and the job efficiency can be enhanced.

EXAMPLES

Examples of mayonnaise-like food of the invention are described below sequentially, together with tasting test examples of the mayonnaise-like food, smell measuring test examples of greenstuff smell or the like before and after concentration process of soybean milk, and body forming test examples of mayonnaise-like food.

It must be noted, however, that the invention is not limited to the following Examples and Test Examples, but may be freely changed and modified within the scope of the technical concept of the invention.

A. Mayonnaise-Like Food Using Concentrated Soybean Milk

In the following Examples 1 to 5 of mayonnaise-like food, Example 1 is a dressing type using guar gum as an emulsifier, Example 2 is a modified composition of Example 1 by adding sweetener and whole fat milk powder, Example 3 is a dressing type using yolk as an emulsifier with a slight addition of sweetness by using liquid sugar and onion extract, Example 4 is a mayonnaise type increased in the content of vegetable oil, and Example 5 is a spread type high in the content of concentrated soybean milk.

Comparative Example 1 is a mayonnaise-like food manufactured by using soybean milk of ordinary concentration instead of concentrated soybean milk.

Example 1

Soybean was extracted in hot water by conventional method, and soybean milk was prepared at Brix concentration of about 12, and it was concentrated at reduced pressure in the condition of pressure of 700 mmHg or less, steam pressure of 6 kg/cm$^2$G, and evaporation temperature of 45° C., and was further treated in high pressure homogenizer in the condition of 100 to 150 kg/cm$^2$, and concentrated soybean milk at Brix concentration of about 25 was obtained.

In succession, vinegar, seasoning, emulsifier and spice were mixed in a mixer, and stirred for 30 to 60 seconds, and the concentrated soybean milk was added and stirred to 60 seconds, and further vegetable oil was added by three or four divided portions in about 30 seconds, and after stirring homogeneously for about 30 to 60 seconds, the mixture was poured into a packaging container, and heated and sterilized for 60 minutes at 65° C., and cooled, and a mayonnaise-like food was obtained.

The composition of the concentrated soybean milk, vinegar, seasoning, emulsifier, spice, and vegetable oil is as follows.

| | |
|---|---|
| Concentrated soybean milk | 50 g |
| Ground sesame | 8 g |
| Sesame oil | 30 g |
| Rapeseed oil | 130 g |
| Rice vinegar | 80 g |
| Seasoning | 10 g |
| Guar gum | 3 g |
| Water | 100 g |
| Total | 411 g |

The guar gum was Bistop (a tradename of San-eigen FFI Inc. of Japan). The seasoning was mainly composed of a broth of dried bonito.

Example 2

A mayonnaise-like food was manufactured same as in Example 1, except that 34 g of wine vinegar was used instead of 80 g of rice vinegar, and 8 g of grape sugar and fruit guar and 18 g of whole fat milk powder were newly added.

Example 3

Concentrated soybean milk, vinegar, seasoning, emulsifier, spice and vegetable oil were blended in the following composition.

| | |
|---|---|
| Concentrated soybean milk | 50 g |
| Ground sesame | 8 g |
| Soy sauce | 60 g |
| Safflower oil | 130 g |
| Liquid glucose & fructose | 48 g |
| Seasoning | 15 g |
| Onion extract | 40 g |
| Rice vinegar | 80 g |
| Yolk | 10 g |
| Water | 70 g |
| Total | 511 g |

The manufacturing condition of concentrated soybean milk and emulsifying condition were the same as in Example 1.

As the emulsifier, instead of yolk, fatty acid monoglyceride, fatty acid polyglyceride, or sucrose fatty acid ester may be used, but from the viewpoint of enhancing the emulsifying power, it is preferred to use them together with yolk.

Example 4

In the same condition as in Example 1, soybean was extracted in hot water by conventional method, and soybean milk was prepared at Brix concentration of about 12, and it was concentrated at reduced pressure in the condition of pressure of 700 mmHg or less, steam pressure of 6 kg/cm$^2$G, and evaporation temperature of 45° C., and was further treated in high pressure homogenizer in the condition of 100 to 150 kg/cm$^2$, and concentrated soybean milk at Brix concentration of about 25 was obtained.

In succession, concentrated soybean milk, vinegar, seasoning, emulsifier, spice, and vegetable oil were mixed in the following composition.

| | |
|---|---|
| Concentrated soybean milk | 100 g |
| Apple vinegar | 70 g |
| Grain mustard | 0.4 g |
| Yeast extract | 7 g |
| Isomerized sugar | 18 g |
| Salt | 4 g |
| Cotton seed oil | 360 g |
| Tragacanth gum | 0.6 g |
| Water | 40 g |
| Total | 600 g |

The emulsifying condition was the same as in Example 1.

The tragacanth gum was a product of San-ei Chemical Co. of Japan.

Example 5

Concentrated soybean milk, vinegar, seasoning, emulsifier, spice and vegetable oil were blended in the following composition.

| | |
|---|---|
| Concentrated soybean milk | 200 g |
| Rice vinegar | 51 g |
| Tomato ketchup | 20 g |
| Seasoning | 2 g |
| Liquid sugar | 70 g |
| Salt | 5 g |
| Soybean, rapeseed blended oil | 200 g |
| Tragacanth gum | 2 g |
| Water | 10 g |
| Total | 560 g |

The manufacturing condition of concentrated soybean milk and emulsifying condition were the same as in Example 1.

The seasoning was Amirich mainly composed of inosinate (a tradename of Ajinomoto Co. of Japan), the liquid sugar was Glister mainly composed of starch syrup (a tradename of Matsutani Chemical Co. of Japan), and the tragacanth gum was a product of San-ei Chemical Co. of Japan.

Comparative Example 1

Using the soybean milk at Brix concentration of about 12 before concentration obtained in Example 4, this soybean milk at ordinary concentration was used as the material instead of the concentrated soybean milk in Example 4, and a mayonnaise-like food was manufactured in the same condition as in Example 1.

Test Example 1

Tasting Test Example of Mayonnaise-Like Food

As a representative example of mayonnaise-like food of the invention among the foregoing Examples, Example 4 was selected, and compared with Comparative Example 1 in the tasting test.

That is, mayonnaise-like foods of Example 4 and Comparative Example 1 were tasted by 12 tasters, an flavor and taste were tested and the overall results were evaluated. The reference was a commercial mayonnaise using yolk instead of soybean milk.

The panel of 12 tasters consisted of 6 men aged from 20 to 55 years, and 6 women aged from 18 to 61 years.

Each taster judged the flavor and taste according to the following criterion and scored from ○ to x, giving 5 points to ○-mark, 3 points to Δ-mark, and 1 point to x-mark, and the average of 10 tasters was calculated in each item of flavor and taste. The overall evaluation is the average of the judgement values of flavor and taste.

Herein, the taste is different from basic senses of sweetness, sourness and saltiness as mentioned above, but is a combined sensation of depth and smoothness, and expresses the intensity (that is, time intensity) of duration of the sense of depth from the fore taste felt at the time of putting in the mouth to the after taste continuing with the lapse of time, as the rich flavor of the concentrated soybean milk is intensified in the mouth and is maintained to product a lasting effect.

Flavor was scored as follows.
○: Rich in flavor, completely free from unpleasant smell.
Δ: Feeling of greenstuff smell. x: Strong greenstuff smell or acridity.

Taste was scored as follows.
○: Deep taste.
Δ: Insufficient taste.
x: Lacking in taste.

Test results are shown below.

|  | Flavor | Taste | Overall evaluation |
|---|---|---|---|
| Example 4 | 4.6 | 4.5 | 4.6 |
| Comparative Example 1 | 1.4 | 3.1 | 2.3 |
| Reference | 3.7 | 3.3 | 3.5 |

According to the results, the mayonnaise-like food in Example 4 was free from greenstuff smell or acridity, and had rich flavor and strong taste, and its overall evaluation was higher than that of the commercial mayonnaise of the reference.

By contrast, Comparative Example 1 had a strong greenstuff smell and acridity, and lacked in taste.

Thus, the mayonnaise-like food using concentrated soybean milk was obviously superior to the product using soybean milk of ordinary concentration, in the aspects of flavor and taste.

Test Example 2

Body Forming Test Example of Mayonnaise-Like Food

Conforming to the foregoing Tasting Test Example, Example 4 of mayonnaise type, Comparative Example 1 using soybean milk at ordinary concentration (Brix concentration 12) instead of concentrated soybean milk, and reference of commercial mayonnaise were selected, and the body forming property was comparatively studied.

The mayonnaise-like food was changed in a tube container, and squeezed into a conical form of 4 cm in bottom diameter and about 4 cm in height (to about second joint of index finger), and collapse of this conical form in 30 minutes at room temperature was observed, and the body forming property of each sample was judged by the conical height retention rate expressed in the following formula.

Conical height retention rate (%)=(conical height in 30 minutes/initial height)×100

In the evaluation of this Test Example, the higher conical height retention rate of sample means a better body forming property, and the lower rate means an inferior body forming property.

Test results are shown below.

|  | Example 4 | Comparative Example 1 | Reference |
|---|---|---|---|
| Conical height retention rate | 96% | 74% | 88% |

According to the results, the mayonnaise-like food of Example 4 was very high in the retention rate, and was superior to the reference in that the shape can be held softly and firmly, and an excellent body forming property was noted.

By contrast, in Comparative Example 1 using soybean milk at ordinary concentration, the conical shape was flattened and deformed, and the body forming property was poor.

Thus, the mayonnaise-like food using concentration soybean milk was obviously superior to the product using ordinary soybean milk also in the aspect of body forming property.

B. Mayonnaise-Like Food Using Concentrated Bean Curd

In the following Examples 6 to 9 of mayonnaise-like food, Example 6 is a composition using xanthan gum as an emulsifier, Example 7 is a composition modified from Example 6 and changed in the content of xanthan gum, Example 8 is a composition using sucrose fatty acid ester and oligosaccharide as an emulsifier, and Example 9 is a composition changing in the rate of concentrated bean curd and oil and using yolk as an emulsifier.

Comparative Example 2 is a composition of mayonnaise-like food using smooth bean curd obtained from soybean milk of ordinary concentration as the material instead of the concentrated bean curd.

Example 6

Soybean was extracted in hot water by conventional method, and soybean milk was prepared at Brix concentration of about 12, and it was concentrated at reduced pressure in the condition of pressure of 700 mmHg or less, steam pressure of 6 kg/cm$^2$G, and evaporation temperature of 45° C., and was further treated in high pressure homogenizer in the condition of 100 to 150 kg/cm$^2$, and concentrated soybean milk at Brix concentration of about 25 was obtained. This concentrated soybean milk was once cooled to 22° C., and the coagulant was added in the following ratio, and it was heated for 50 minutes at 92° C., and concentrated bean curd was manufactured, and cooled, and slightly crushed by Stefan cutter to a slightly grainy texture.

| Concentrated soybean milk | 60 kg |
|---|---|
| Magnesium chloride | 110 g |
| Glucono delta lactone | 110 g |
| Water | 4.8 L |

In succession, vinegar, seasoning, emulsifier and spice were mixed in a mixer, and stirred for 30 to 60 seconds, and the crushed matter of the concentrated bean curd was added and stirred to 60 seconds, and further vegetable oil was added by three or four divided portions in about 30 seconds, and after stirring homogeneously for about 30 to 60 seconds, the mixture was poured into a packaging container, and heated and sterilized for 60 minutes at 65° C., and cooled, and a mayonnaise-like food was obtained.

The composition of the concentrated bean curd, vinegar, seasoning, emulsifier, spice, and vegetable oil is as follows.

| | |
|---|---|
| Concentrated bean curd | 100 g |
| Apple vinegar | 80 g |
| Mustard powder | 0.5 g |
| Chemical seasoning | 2 g |
| Liquid glucose & fructose | 48 g |
| Salt | 9 g |
| Rapeseed oil | 180 g |
| Xanthan gum | 0.5 g |
| Water | 80 g |
| Total | 500 g |

The xanthan gum was Echo Gum SF (a tradename of Dainippon Pharmaceutical Co. of Japan).

Example 7

A mayonnaise-like food was manufactured by the same method as in Example 6 basically, but by using 30 g of sesame oil and 150 g of corn oil instead of 180 g of rapeseed oil, 73 g of apple vinegar instead of 80 g, 10 g of salt instead of 9 g, 0.5 g of guar gum instead of 0.5 g of xanthan gum, and 100 g of water instead of 80 g, further adding 8.5 of ground sesame and omitting mustard powder and chemical seasoning.

Example 8

A mayonnaise-like food was manufactured by the same method as in Example 6 basically, but by using 2 g of sucrose fatty acid ester instead of 0.5 g of xanthan gum, and 30 g of liquid glucose and fructose instead of 48 g, and further adding 16.5 g of isomalto-oligosaccharide.

The sucrose fatty acid ester was DK Ester (a tradename of Daiichi Kogyo Pharmaceutical Co. of Japan), and isomalto-oligosaccharide was Panolap (a tradename of Hayashihara Co. of Japan).

Example 9

Concentrated bean curd, vinegar, seasoning, emulsifier, spice, and vegetable oil were blended in the following composition.

| | |
|---|---|
| Concentrated bean curd | 40 g |
| Wine vinegar | 34 g |
| Mustard powder | 1 g |
| Chemical seasoning | 2 g |
| Liquid glucose & fructose | 8 g |
| Salt | 5 g |
| Olive oil | 240 g |
| Yolk | 12 g |
| Whole fat milk powder | 18 g |
| Water | 40 g |
| Total | 400 g |

The manufacturing condition of concentrated bead curd and emulsifying condition are the same as in Example 6.

Comparative Example 2

Using the soybean milk at Brix concentration of about 12 obtained in Example 6, it was directly coagulated and smooth bean curd was obtained, and this smooth bean curd was used as the material instead of the concentrated bean curd in Example 6, and a mayonnaise-like food was manufactured by the same condition as in Example 6.

Test Example 3 (Tasting Test Example of Mayonnaise-Like Food)

As a representative example of mayonnaise-like food of the invention among the foregoing Examples, Example 6 was selected, and compared with Comparative Example 2 in the tasting test.

That is, mayonnaise-like foods of Example 6 and Comparative Example 2 were tasted by 10 tasters, an flavor and taste were tested and the overall results were evaluated. The reference was a commercial mayonnaise using yolk instead of bean curd.

The panel of 10 tasters consisted of 5 men aged from 22 to 59 years, and 5 women aged from 19 to 53 years.

Each taster judged the flavor and texture according to the following criterion and scored from ○ to x, giving 5 points to ○-mark, 3 points to Δ-mark, and 1 point to x-mark, and the average of 10 tasters was calculated in each item of flavor and texture. The overall evaluation is the average of the judgement values of flavor and texture.

Flavor was scored as follows.
○: Rich in flavor, completely free from unpleasant smell.
Δ: Feeling of greenstuff smell.
x: Strong greenstuff smell or acridity.
Texture was scored as follows.
○: Mild in swallowing.
Δ: Insufficient smoothness in throat to slight strangeness.
x: Poor in smoothness in throat.
Test results are shown below.

| | Flavor | Taste | Overall evaluation |
|---|---|---|---|
| Example 6 | 4.7 | 4.3 | 4.5 |
| Comparative Example 2 | 1.9 | 3.1 | 2.5 |
| Reference | 4.4 | 4.2 | 4.3 |

According to the results, the mayonnaise-like food in Example 6 was free from greenstuff smell or acridity, and had rich flavor and mild texture, and its overall evaluation was higher than that of the commercial mayonnaise of the reference.

By contrast, Comparative Example 2 had a strong greenstuff smell and acridity, and was not smooth in texture.

Thus, the mayonnaise-like food using concentrated bean curd was obviously superior to the product using smooth bean curd made from soybean milk of ordinary concentration, in the aspects of flavor, texture and taste.

Test Example 4

Study on Contents of Unpleasant Smell Causative Matter

As mentioned above, major causes of greenstuff smell of soybean milk, and unpleasant smell and acridity of soybean are volatile matters such as n-hexanal, n-hexanol, and 1-octene-3-ol.

Accordingly, the concentrated soybean milk used in Example 4 and ordinary soybean milk used in Comparative Example 1 were analyzed by gas chromatography, and these volatile matters were detected, and the following results were obtained.

In this gas chromatography, the gas chromatograph of Shimadzu Corporation was used in the following condition.

Column: Silicone grease (15% contained in 100 to 120 mesh cerite), SE-30 (1% contained in Gaschrom P), ethylene glycol succinate ester S—X (8% contained in Gaschrom P).

Heating condition : 100 to 190° C.

Flow velocity condition: 3 kg/cm$^2$

In the following table, the detection concentration of each substance is expressed as relative value of each detection peak area in the gas chromatogram in Example 4 and Comparative Example 1 for the sake of convenience, and the detected value of Comparative Example 1 is supposed to be 100 (average of two experiments).

|  | Example 4 | Comparative Example 1 |
| --- | --- | --- |
| n-Hexanol | 16.5 | 100 |
| n-Hexanal | 15.5 | 100 |
| 1-Octene-3-ol | 12.5 | 100 |

As the results suggest, as compared with the soybean milk of ordinary concentration of Comparative Example 1, the volatile matters are substantially decreased in the concentrated soybean milk in Example 4.

Thus, this test has also supported the results of the sensory tests proving that the mayonnaise-like food of the invention using concentrated soybean milk or concentrated bean curd is excellent in both flavor and taste, as compared with the composition prepared by using soybean milk or bean curd of ordinary concentration.

The invention claimed is:

1. A mayonnaise-like food, being an edible emulsified matter prepared by mixing and emulsifying 5 to 60 wt % soybean milk, 5 to 40 wt % vinegar, seasoning, spice, 0.01 to 5 wt % emulsifier, and 10 to 80 wt % vegetable oil, wherein said soybean milk is a concentrated soybean milk at Brix concentration of 20 to 40.

2. The mayonnaise-like food of claim 1, wherein the mayonnaise-like food contains 10 to 30 wt % of said soybean milk.

3. The mayonnaise-like food of claim 1, wherein the mayonnaise-like food contains 7 to 25 wt % of said vinegar.

4. The mayonnaise-like food of claim 1, wherein the mayonnaise-like food contains 20 to 70 wt % of said vegetable oil.

5. The mayonnaise-like food of claim 1, wherein the mayonnaise-like food contains 0.1 to 3.0 wt % of said emulsifier.

6. A mayonnaise-like food, being an edible emulsified matter prepared by mixing and emulsifying 5 to 60 wt % bean curd, 5 to 40 wt % vinegar, seasoning, spice, 0.01 to 5 wt % emulsifier, and 10 to 80 wt % vegetable oil, wherein said bean curd is a concentrated bean curd prepared by coagulating a concentrated soybean milk at Brix concentration of 15 or more by use of coagulant.

7. The mayonnaise-like food of claim 1 or 6, wherein the emulsifier is one or two or more types selected from the group consisting of thickening polysaccharide, lecithin, fatty acid monoglyceride, fatty acid polyglyceride, sucrose fatty acid ester, and sorbitan fatty acid ester.

8. The mayonnaise-like food of claim 6, wherein the mayonnaise-like food contains 10 to 30 wt % of said bean curd.

9. The mayonnaise-like food of claim 6, wherein the mayonnaise-like food contains 7 to 25 wt % of said vinegar.

10. The mayonnaise-like food of claim 6, wherein the mayonnaise-like food contains 20 to 70 wt % of said vegetable oil.

11. The mayonnaise-like food of claim 6, wherein the mayonnaise-like food contains 0.1 to 3.0 wt % of said emulsifier.

12. A manufacturing method of mayonnaise-like food characterized by mixing and preliminarily emulsifying 5 to 40 wt % vinegar, seasoning, spice, and 0.01 to 5 wt % emulsifier, mixing 5 to 60 wt % of a concentrated soybean milk at Brix concentration of 20 to 40 or a concentrated bean curd prepared by coagulating a concentrated soybean milk at Brix concentration of 15 or more by use of a coagulant, and further mixing and emulsifying 10 to 80 wt % vegetable oil.

13. The method of claim 12, wherein the mayonnaise-like food contains 10 to 30 wt % of said soybean milk.

14. The method of claim 12, wherein the mayonnaise-like food contains 7 to 25 wt % of said vinegar.

15. The method of claim 4, wherein the mayonnaise-like food contains 20 to 70 wt % of said vegetable oil.

16. The method of claim 12, wherein the mayonnaise-like food contains 0.1 to 3.0 wt % of said emulsifier.

* * * * *